United States Patent [19]

Woychesin et al.

[11] 4,102,981

[45] Jul. 25, 1978

[54] REMOVAL OF ACIDIC IMPURITY FROM CHLOROFLUOROMETHANES

[75] Inventors: Elias A. Woychesin, Livermore, Calif.; Clovis P. Legleu, III, Baton Rouge, La.

[73] Assignee: Kaiser Aluminum & Chemical Corporation, Oakland, Calif.

[21] Appl. No.: 826,595

[22] Filed: Aug. 22, 1977

[51] Int. Cl.$^2$ ............................................. B01D 53/34
[52] U.S. Cl. ................................ 423/240; 260/652 P
[58] Field of Search ............................ 423/240, 241; 260/652 P, 653, 653.6, 653.7

[56] References Cited

U.S. PATENT DOCUMENTS 2,443,630  6/1948  McBee et al. ...................... 260/653.7
2,470,088  5/1949  Benning et al. ....................... 260/653

Primary Examiner—Earl C. Thomas
Attorney, Agent, or Firm—Paul E. Calrow; Andrew E. Barlay

[57] ABSTRACT

Acidic impurity, such as HCl, is removed from chlorofluoromethanes of the formula $CHCl_nF_{3-n}$, where $n$ is 1 or 2, by scrubbing the contaminated fluorocarbon with an aqueous solution made from a mixture of trisodium phosphate and sodium hydroxide. Use of this solution as scrubbing medium allows purification of the contaminated fluorocarbon without appreciable decomposition and also without generation of a significant quantity of environmentally objectionable waste stream of high phosphate content. The presence of NaOH in the scrubbing medium provides in situ regeneration of mono and disodium phosphates to trisodium phosphate.

6 Claims, 1 Drawing Figure

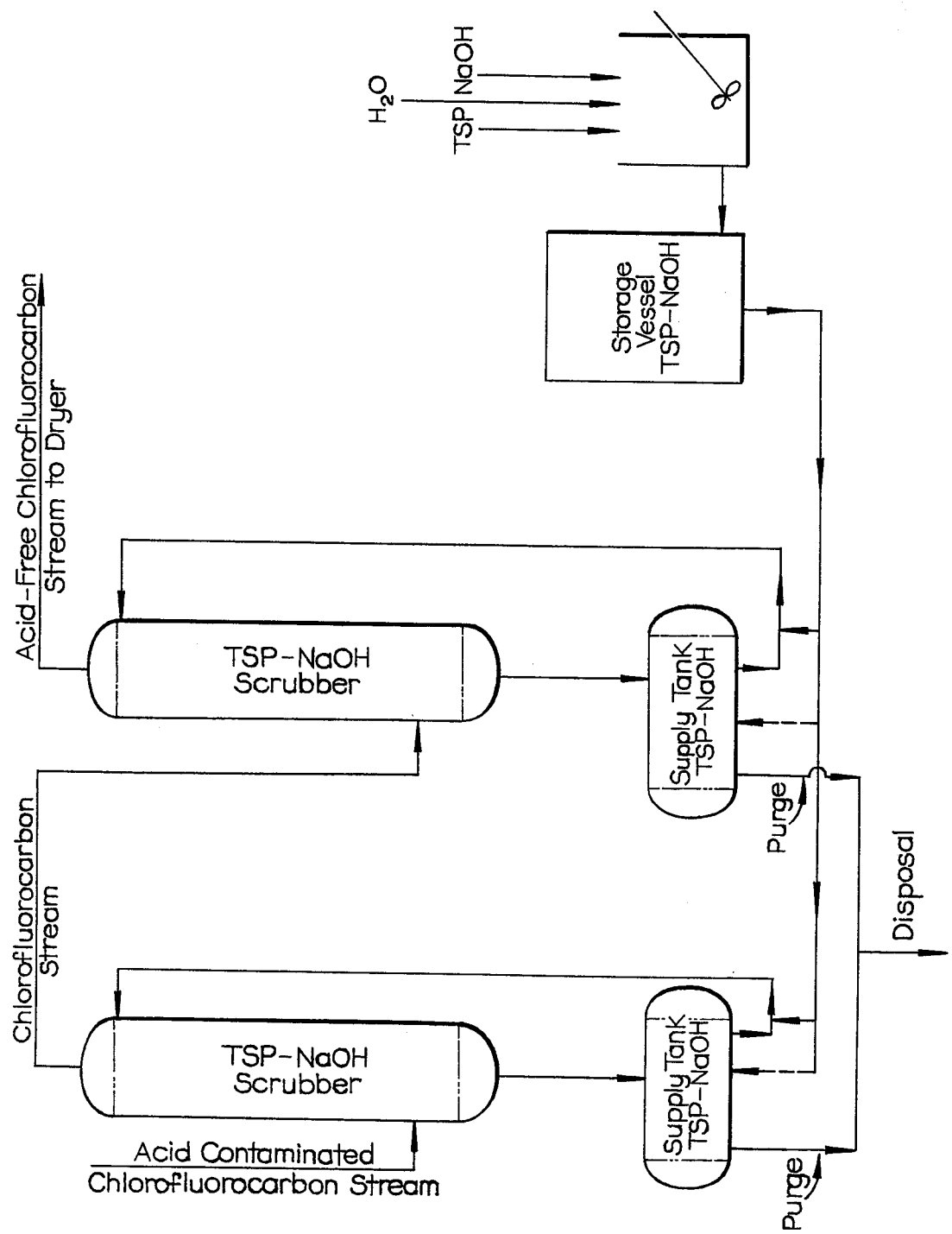

REMOVAL OF ACIDIC IMPURITY FROM CHLOROFLUOROMETHANES

BACKGROUND OF THE INVENTION

In the conventional method of manufacturing fluorocarbons of the formula $CHCl_nF_{3-n}$, where $n$ is 1 or 2, the fluorocarbon stream exiting from the reactor generally contains a substantial quantity of acidic impurity, such as HCl. Removal of this acidic impurity from the fluorocarbon is usually accomplished by absorption. However, regardless of the type of absorber used, the fluorocarbon stream exiting from the absorber will still contain a harmful quantity of residual HCl impurity, usually in the range of about 0.10-0.60% by weight. This acidic impurity due to its highly corrosive nature, unless removed from the fluorocarbon, will seriously interfere with the further use and processing of the fluorocarbon.

In the past, this residual acidic impurity has been removed from the fluorocarbon stream by scrubbing with an aqueous solution of a base of intermediate strength, generally with a base having a pH in aqueous solution below about 13. In conventional scrubbing systems, an aqueous solution of trisodium phosphate has been generally employed. This basic compound has a pH of about 13 in aqueous medium. Stronger bases, such as sodium hydroxide, could not be used as sodium hydroxide readily hydrolyzes the fluorocarbons to formic acid and $CO_2$. Consequently, use of strong bases (pH > 13) is avoided in the purification of acid-contaminated fluorocarbons of the formula referred to above.

The use of trisodium phosphate ($Na_3PO_4$) for scrubbing purposes has been found quite satisfactory. Nonetheless, its utilization has certain disadvantages apart from cost considerations. Thus, during the neutralization of HCl with an aqueous trisodium phosphate solution, as the pH of the solution decreases, generation of acidic phosphate salts occur, which reduce the effectiveness of the trisodium phosphate solution as a scrubbing medium. The reaction between the HCl contaminant of the fluorocarbon stream and the trisodium phosphate neutralizing agent is shown below.

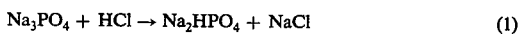

$$Na_3PO_4 + HCl \rightarrow Na_2HPO_4 + NaCl \quad (1)$$

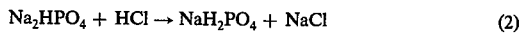

$$Na_2HPO_4 + HCl \rightarrow NaH_2PO_4 + NaCl \quad (2)$$

These reactions cause a significant reduction in the pH of the scrubbing medium with corresponding loss in HCl conversion efficiency. In order to restore the efficiency of HCl removal from the fluorocarbon stream in the conventional practice, the exhausted scrubbing solution is discarded and entirely replaced with a fresh solution.

Regeneration of the exhausted scrubbing solution, i.e., restoration of its trisodium phosphate content, has been found impractical. On one hand, since the exhausted solution contains a significant quantity of sodium chloride, regeneration will not remove this salt and its buildup in the regenerated scrubbing medium continues until deposition of precipitated NaCl will seriously affect the scrubbing operation and operation of the equipment associated with the scrubbing. On the other hand, the volume of scrubbing medium is generally quite large, thus regeneration of these large volumes involves extensive and expensive equipment and operating steps.

Direct disposition of the exhausted scrubbing medium into natural receiving bodies, due to its high $PO_4^{3-}$—ion concentration, results in environmental problems. Removal of the phosphate content of this solution prior to disposal is impractical, expensive and technically unfeasible. Thus, the above-referred to problems arising with the utilization of trisodium phosphate as scrubbing medium for fluorocarbons pose such problems which render the use of this material unsatisfactory.

It has now been discovered that the difficulties associated with the employment of trisodium phosphate as scrubbing medium for HCl contaminated fluorocarbon streams can be substantially eliminated by employing a scrubbing solution containing in combination with trisodium phosphate a controlled quantity of sodium hydroxide. Utilization of sodium hydroxide in the scrubbing medium allows in situ regeneration of acidic phosphate salt species to trisodium phosphate, thus retaining the efficiency of the scrubbing medium. At least periodic purging of a portion of the scrubbing medium and at least periodic replacement of the purged portion with fresh trisodium phosphate-sodium hydroxide solution allows control both of the sodium chloride content of the scrubbing solution and also of its pH. Additionally, purging only removes a small portion of the scrubbing medium and due to the significantly lower total phosphate ion content in this portion, disposal of the purge stream, even into natural receiving bodies, meets environmental restrictions.

BRIEF SUMMARY OF THE INVENTION

An improved process is provided for removing acidic contaminants from fluorocarbon streams by scrubbing the stream with an aqueous solution containing a mixture of trisodium phosphate and a controlled quantity of sodium hydroxide. The scrubbing solution contains from about 3 to about 7% by weight trisodium phosphate and from about 1 to about 6% by weight sodium hydroxide. At least periodically, a portion of the scrubbing solution is purged and the purged portion of the solution is replenished with a substantially equal portion of trisodium phosphate sodium hydroxide solution of essentially the same concentration as employed for scrubbing. This allows control of the pH of the scrubbing solution, provides a convenient way to maintain a desirable sodium chloride concentration in the scrubbing medium and also allows ready disposal of the purged stream.

BRIEF DISCUSSION OF THE FIGURE

The FIGURE schematically shows a two-stage scrubbing system for the removal of HCl from chlorofluoromethane streams. In this system, in each stage an aqueous scrubbing solution containing a mixture of trisodium phosphate and sodium hydroxide is utilized for conversion of the HCl to sodium chloride.

DETAILED DESCRIPTION OF THE INVENTION

This invention relates to the removal of residual acidic impurity from fluorocarbon streams. More particularly, it concerns the removal of the residual HCl content from chlorofluoromethanes of the formula $CHCl_nF_{3-n}$, where $n$ is 1 or 2, by scrubbing the acid-contaminated stream with an aqueous scrubbing solution containing a mixture of trisodium phosphate and a controlled quantity of sodium hydroxide.

In the preparation of the above chlorofluoromethanes, a fluorocarbon stream is generally produced by the well-known reaction between chloroform ($CHCl_3$) and HF. The reaction results in the production of $CHCl_2F$ or $CHClF_2$ or mixtures of these and as by-product always a significant quantity of HCl is generated. The main portion of the HCl content of the fluorocarbon stream is generally removed by conducting the fluorocarbon stream through an absorber containing water as the absorption medium. However, this method of absorption is not capable of removing the entire quantity of HCl present in the fluorocarbon stream and the stream exiting from this absorber generally contains between about 0.1 and 0.6% by weight residual HCl.

Removal of the residual HCl according to the present invention is accomplished by using as HCl absorber an aqueous scrubbing medium containing a mixture of trisodium phosphate ($Na_3PO_4$), also referred to as "TSP", and a controlled quantity of sodium hydroxide.

It has been found that removal of residual HCl from the fluorocarbon stream can be best accomplished by employing aqueous scrubbing solutions containing from about 3 to about 7% by weight $Na_3PO_4$ and from about 1 to about 6% by weight NaOH. Within these concentration limits, the pH of the scrubbing solution can be controlled below about 13 and consequently no appreciable fluorocarbon decomposition occurs during contact of the fluorocarbon stream and the scrubbing medium.

It is also possible to employ scrubbing solutions of lower TSP and/or NaOH concentrations; however, at lower TSP concentrations, the removal of the acid impurity may not be satisfactory. At lower NaOH concentrations, the in situ reconversion of the acidic phosphate salt species, e.g., $Na_2HPO_4$ and/or $NaH_2PO_4$, to $Na_3PO_4$, may not be complete with consequent reduction in the efficiency of the solution as scrubbing medium.

Although higher TSP and/or NaOH concentrations can be utilized, care must be taken that the temperature of the scrubbing medium is sufficiently high to avoid possible crystallization of the TSP and NaCl components of the solution with corresponding operating problems and reduced scrubbing efficiency.

Thus, it has been found that for optimum results, in terms of operating efficiency and in HCl conversion, at temperatures between about 8° C and about 50° C, the TSP concentration of the scrubbing solution should be kept within the limits of about 3 to 6% by weight and the quantity of NaOH in the medium should be maintained within the limits of about 3 to 6% by weight.

At higher operating temperatures, both the TSP and NaOH concentrations can be increased to the upper limit shown above without danger of crystallization of the TSP component with corresponding interference with the operating equipment.

Consequently, it is to be understood that the lower limits of TSP and NaOH concentrations shown above apply to relatively low temperatures while the upper limit of the salt concentrations to temperatures not in excess of about 50° C.

Scrubbing of the residual acid-contaminated fluorocarbon stream according to the instant invention is generally accomplished in conventional scrubbing equipment, e.g., in a countercurrent manner in a vertical, cylindrical vessel, wherein the contaminated fluorocarbon stream flows upwards and the scrubbing solution flows in a downwardly direction. To obtain extended contact between these streams, the scrubber can be filled with any desired packing, such as Raschig rings. It is to be understood that any desired scrubbing apparatus may be employed for accomplishing the purpose of the present invention, provided sufficient contact is achieved between the acid-contaminated fluorocarbon stream and the scrubbing solution.

In order to obtain the desirable control of the pH in the scrubbing medium, as well as control of the sodium chloride (NaCl) content in the scrubbing solution, at least periodically a portion of the scrubbing medium, which has already been in contact with the acid-contaminated fluorocarbon stream is purged from the scrubbing medium. The volume to be removed from the scrubber medium by purge depends on the TSP concentration remaining in the medium and the level at which this content is to be maintained for efficient operation of the system. To assure that the pH of the scrubber medium is maintained at the desired level, the portion purged from the scrubber system is replaced essentially with the same volume of fresh scrubbing solution having substantially the same concentration of TSP and NaOH as the original scrubber solution.

For smooth operating controls and improved efficiency, continuous purging and replenishment of the purged portion is recommended, although it remains within the discretion of the user of the instant scrubbing process to employ continuous, semicontinuous or periodical purging and replenishment.

Scrubbing can be accomplished in one or more stages, depending on the concentration of residual HCl in the fluorocarbon stream. In case the HCl concentration in the fluorocarbon stream is in excess of about 0.4% by weight, for best results, a scrubbing system comprising two or more conventional scrubbing units is recommended. Naturally, if the scrubber system utilized consisting of a single scrubber unit allows sufficiently long contact time between the contaminated fluorocarbon stream and the scrubbing medium, such single unit system will also be capable of eliminating the acidic impurity from the fluorocarbon stream. Consequently, the determination of the size and number of scrubbers to be utilized with the instant scrubbing medium remains entirely within the discretion of the practitioner and can be generally established by a few preliminary runs.

To further illustrate the process of the instant invention, the following Example is provided.

EXAMPLE

In the preparation of $CHCl_2F$ and $CHClF_2$ from $CHCl_3$ by reaction with HF, an HCl-contaminated fluorocarbon stream was generated. This stream was continuously introduced in an absorption tower of conventional design, where a major portion of the HCl contaminant was removed by absorption with water. The partially purified fluorocarbon stream exiting from this tower was then continuously introduced into a two-stage scrubbing system, such as schematically shown in the FIGURE. The vapor-phase fluorocarbon stream had the following composition: $CHCl_3$ 265 kg/hour, $CHCl_2F$ 2560.7 kg/hour, $CHClF_2$ 2431.3 kg/hour, $H_2O$ 60.8 kg/hour and HCl 28.1 kg/hour. In percentage, the residual HCl content of the stream was 0.53% by weight. The HCl-contaminated stream was charged to the lower section of a scrubber filled with packing. Simultaneously, a stream of scrubber solution was charged to the top portion of the scrubber to obtain a countercurrent contact between the upwardly traveling fluorocarbon vapors and the downwardly proceeding scrubber solution. The scrubber solution employed for removal of the residual HCl-content of the fluorocarbon stream contained 24.5 kg/hour NaOH, 25.8 kg/hour $Na_3PO_4$ and 469.0 kg/hour water. The sodium hydroxide concentration of the scrubber medium corresponded to 4.72% by weight, while the TSP concentration was equivalent to 4.97% by weight. The pH of the scrubber solution in the system in contact with the fluorocarbon stream was between about 9–11, and the temperature of the solution was maintained at about 37°–50° C. The scrubbed fluorocarbon vapors were then charged to the bottom portion of a second scrubber unit and were scrubbed again countercurrently with a descending stream of scrubber solution of the same concentration and volume as employed in the first scrubber. A portion of the scrubber solution exiting from the first scrubber was purged at an average rate of about 8.7 liters/minute and the same volume of fresh aqueous $Na_3PO_4$-NaOH solution, such as used for scrubbing was charged to the scrubbing medium feed line entering the top of the scrubber. Scrubbing solution exiting from the second scrubber was purged at the average rate of about 0.6 liter/minute and the purged portion was replaced with fresh scrubbing medium at the same rate. The scrubbed fluorocarbon vapors were then conducted through $H_2SO_4$-filled driers to remove the residual water content. The dried fluorocarbon vapor was analyzed for HCl impurity by using an $AgNO_3$ solution and found to be free of residual HCl. The combined purge streams, containing essentially water and dissolved sodium chloride, had an approximately 4.0% $Na_2HPO_4$ content. This allowed its direct disposal at the low rate of purge used which corresponded to about 22 kg/hour $Na_2HPO_4$.

It is to be understood that the concept of the instant invention encompasses diverse means to provide for the trisodium phosphate-sodium hydroxide solution used for scrubbing of acid-contaminated chlorofluoromethanes. Thus, in lieu of premixing these chemical substances prior to contact with the stream of contaminated fluorocarbons, the stream can be first scrubbed with a TSP solution and then to the TSP solution exiting from the scrubber, a metered flow of NaOH solution can be incorporated.

Consequently, it is apparent from the above that various changes and modifications may be made to the invention without departing from the spirit thereof. Accordingly, the scope of the invention is only limited by the appended claims.

What is claimed is:
1. In the process of removing acidic contaminants from streams containing aliphatic fluorocarbons of the formula $CHCl_nF_{3-n}$, where $n$ is 1 or 2, and the acidic impurity is HCl, by scrubbing the stream with an aqueous solution of trisodium phosphate in a scrubber system, the improvement which comprises scrubbing the HCl-contaminated stream in at least one scrubber with an aqueous solution containing a mixture of trisodium phosphate and sodium hydroxide, the solution having a trisodium phosphate content from about 3% to about 7% by weight and a sodium hydroxide concentration from about 1% to about 6% by weight, at least periodically purging a portion of the aqueous solution after contact with the acid-contaminated fluorocarbon streams, replenishing the purged portion with a substantially equal volume of fresh aqueous scrubbing solution containing essentially the concentration of sodium hydroxide and trisodium phosphate as the scrubbing solution prior to contact with the acid-contaminated fluorocarbon streams, recycling the replenished scrubbing solution to the scrubbing step and disposing of the purged portion.

2. Process according to claim 1, wherein the temperature of the scrubbing solution is kept within the limits of about 8° C and +50° C and the trisodium phosphate concentration of the scrubbing solution is maintained within limits of about 3% to about 6% by weight at a sodium hydroxide concentration of from about 3% to about 6% by weight.

3. Process according to claim 1, wherein the trisodium phosphate and sodium hydroxide components of the scrubbing solution are premixed prior to contact with the contaminated fluorocarbon stream.

4. Process according to claim 1, wherein a contaminated fluorocarbon stream is first contacted with a trisodium phosphate solution and then the scrubbing solution exiting from the scrubber is admixed with a metered flow of a mixture of trisodium phosphate-sodium hydroxide solution and this admixture is recycled to the scrubber for scrubbing streams or contaminated fluorocarbons.

5. Process according to claim 1, wherein both the purging and the replenishing steps are practiced in a continuous manner.

6. Process according to claim 1, wherein the scrubber system consists of at least two interconnected scrubbers and wherein the scrubbed fluorocarbon stream exiting from the first scrubber of the system is introduced into the second scrubber of the system to complete the removal of residual acidic impurities from the stream.

* * * * *